(12) United States Patent
Mula et al.

(10) Patent No.: US 12,149,340 B2
(45) Date of Patent: Nov. 19, 2024

(54) TIME DIVISION COMMUNICATION VIA OPTICAL SWITCH FABRIC

(71) Applicant: Mellanox Technologies TLV Ltd., Raanana (IL)

(72) Inventors: Liron Mula, Ramat Gan (IL); Elad Mentovich, Tel Aviv (IL); Paraskevas Bakopoulos, Ilion (GR); Eitan Zahavi, Zichron Yaakov (IL); Sagi Kuks, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 576 days.

(21) Appl. No.: 17/413,555

(22) PCT Filed: Jan. 3, 2019

(86) PCT No.: PCT/GR2019/000001
§ 371 (c)(1),
(2) Date: Jun. 13, 2021

(87) PCT Pub. No.: WO2020/141334
PCT Pub. Date: Jul. 9, 2020

(65) Prior Publication Data
US 2021/0384998 A1 Dec. 9, 2021

(51) Int. Cl.
*H04J 3/06* (2006.01)
*H04Q 11/00* (2006.01)
(52) U.S. Cl.
CPC .......... *H04J 3/0658* (2013.01); *H04J 3/0697* (2013.01); *H04Q 11/0005* (2013.01);
(Continued)

(58) Field of Classification Search
CPC .. H04W 72/23; H04W 8/245; H04W 72/0446
See application file for complete search history.

(56) References Cited

U.S. PATENT DOCUMENTS 7,426,206 B1 9/2008 Ofek et al.
9,584,885 B2 2/2017 Mehrvar
(Continued)

FOREIGN PATENT DOCUMENTS

WO 2020141334 A1 7/2020

OTHER PUBLICATIONS

IEEE Standard 1588-2008, "IEEE Standard for a Precision Clock Synchronization Protocol for Networked Measurement and Control Systems", IEEE Instrumentation and Measurement Society, pp. 1-289, Jul. 24, 2008.
(Continued)

*Primary Examiner* — Samina F Choudhry
(74) *Attorney, Agent, or Firm* — MEITAR PATENTS LTD.

(57) ABSTRACT

A network element (36) includes circuitry and at least one port (72). The at least one port is coupled to an optical fabric (32) including one or more optical switches (40) that provide optical paths between the at least one port and multiple destination nodes, at predefined time slots. The circuitry is configured to hold a schedule plan (84) that specifies which of the destination nodes are accessible via the optical fabric at which of the time slots, to queue packets that are destined to the destination nodes, and to transmit the queued packets via the at least one port in accordance with the schedule plan.

22 Claims, 3 Drawing Sheets

(52) U.S. Cl.
CPC . *H04Q 11/0066* (2013.01); *H04Q 2011/0033* (2013.01); *H04Q 2011/005* (2013.01); *H04Q 2011/0064* (2013.01)

(56) References Cited

U.S. PATENT DOCUMENTS

| | | | |
|---|---|---|---|
| 9,883,262 | B2 | 1/2018 | Hattori et al. |
| 2006/0115267 | A1* | 6/2006 | Kesselman ............ H04L 47/562 398/51 |
| 2006/0120371 | A1* | 6/2006 | Huang ................... H04L 45/02 370/392 |
| 2006/0120379 | A1 | 6/2006 | Beshai |
| 2015/0104171 | A1 | 4/2015 | Hu et al. |
| 2016/0337442 | A1 | 11/2016 | Idicula et al. |
| 2018/0006681 | A1 | 1/2018 | Bi et al. |
| 2020/0045519 | A1 | 2/2020 | Raleigh et al. |
| 2020/0092950 | A1 | 3/2020 | Schnaare et al. |
| 2021/0297151 | A1 | 9/2021 | Levi et al. |

OTHER PUBLICATIONS

Forencich et al., "Corundum: An Open-Source 100-Gbps NIC," Proceedings of the 2020 IEEE 28th Annual International Symposium on Field-Programmable Custom Computing Machines (FCCM), pp. 38-46, year 2020.

IEEE Standard 802.1Qbv, "IEEE Standard for Local and Metropolitan Area Networks—Bridges and Bridged Networks—Amendment 25: Enhancements for Scheduled Traffic," IEEE Computer Society, pp. 1-57, Mar. 18, 2016.

IEEE Standard 802.1Qat, "IEEE Standard for Local and Metropolitan Area Networks—Virtual Bridged Local Area Networks—Amendment 14: Stream Reservation Protocol (SRP)," IEEE Computer Society, pp. 1-119, Sep. 30, 2010.

International Application # PCT/GR2019/000001 Search Report dated Aug. 27, 2019.

Klyne et al., "Date and Time on the Internet: Timestamps," Request for Comments: 3339, Network Working Group, The Internet Society, pp. 1-18, Jul. 2002.

U.S. Appl. No. 17/665,600 Office Action dated Apr. 25, 2024.

* cited by examiner

TIME DIVISION COMMUNICATION VIA OPTICAL SWITCH FABRIC

TECHNICAL FIELD

Embodiments described herein relate generally to communication networks, and particularly to methods and systems for synchronizing traffic delivery between electrical and optical switches.

BACKGROUND

Various systems employ communication techniques that are based on modulating data over light. Networking techniques that are based on transmitting data over light beams are known in the art. For example, U.S. Pat. No. 9,584,885 describes a method of photonic frame scheduling that includes receiving, by a photonic switching fabric from a top of rack (TOR) switch, a frame request requesting a time slot for switching an optical frame to an output port of a photonic switch of the photonic switching fabric and determining whether the output port of the photonic switch is available during the time slot, and generating a contention signal including a grant or a rejection, in accordance with the determining. Also, the method includes assigning the time slot to the TOR switch for the output port of the photonic switch, when the contention signal includes the grant, transmitting, by the photonic switching fabric to the TOR switch, the contention signal and receiving, by the photonic switching fabric from the TOR switch, the optical frame during the time slot, when the contention signal includes the grant.

U.S. Pat. No. 9,883,262 describes an optical network system that includes a master node and a plurality of optical switch nodes, allowing the number of nodes without depending on the number of wavelengths. The master node is configured to: divide a wavelength path having an arbitrary wavelength into time slots each having a predetermined time period; and allocate the time slots to each of the optical switch nodes. Each of the optical switch nodes is configured to: synchronize the time slots based on information delivered from the master node; and thereby transmit or receive a data or performs route switching.

SUMMARY

An embodiment that is described herein provides a network element that includes circuitry and at least one port. The at least one port is coupled to an optical fabric including one or more optical switches that provide optical paths between the at least one port and multiple destination nodes, at predefined time slots. The circuitry is configured to hold a schedule plan that specifies which of the destination nodes are accessible via the optical fabric at which of the time slots, to queue packets that are destined to the destination nodes, and to transmit the queued packets via the at least one port in accordance with the schedule plan.

In some embodiments, the circuitry is configured to hold the schedule plan by holding a mapping between the time slots, and respective destination nodes that are accessible by the at least one port via the optical switch fabric during the time slots. In other embodiments, the schedule plan is independent from packets that are actually queued for transmission via the at least one port. In yet other embodiments, the circuitry is configured to hold a schedule plan that specifies a time slot for transmitting packets to a given destination node, before queueing packets that are destined to the given destination node.

In an embodiment, the circuitry is configured to hold the schedule plan by specifying a cyclic sequence of destination nodes that are accessible in a sequence of successive time slots. In another embodiment, the circuitry is configured to hold a time reference that is shared with the optical switches, and to transmit a queued packet at a respective time slot in response to identifying that the time slot has started, based on the time reference. In yet another embodiment, the circuitry is configured to receive time synchronization massages, and to update the time reference in response to the time synchronization massages.

In some embodiments, the circuitry is configured to queue packets having respective priority levels, and that are destined to the at least one port, in multiple respective priority queues, to select a priority queue using a predefined arbitration scheme, to determine a time slot for a packet in the selected priority queue using the schedule plan, and to transmit the packet from the selected priority queue at the determined time slot. In other embodiments, the circuitry is configured to transmit the queued packets to the optical fabric via a first port of the network element, and to receive packets from the switch fabric via a different second port of the network element. In yet other embodiments, the circuitry is configured to transmit a first packet to the optical fabric via a given port at a given time slot, and to receive a second packet from the optical fabric via the given port at the given time slot, so that data included in the first and second packets is modulated over light beams having first and second different respective wavelengths.

There is additionally provided, in accordance with an embodiment that is described herein, a method for communication, including, in a network element that includes at least one port coupled to an optical fabric including one or more optical switches that provide optical paths between the at least one port and multiple destination nodes, at predefined time slots, holding a schedule plan that specifies which of the destination nodes are accessible via the optical fabric at which of the time slots. Packets that are destined to the destination nodes are queued, and the queued packets are transmitted via the at least one port in accordance with the schedule plan.

There is additionally provided, in accordance with an embodiment that is described herein, an apparatus for communication that includes multiple network elements. The multiple network elements are coupled to multiple network nodes, and to an optical fabric including one or more optical switches that provide optical paths between respective pairs of network elements, at predefined time slots. Each of the network elements is configured to hold a schedule plan that specifies which of the destination nodes that are coupled to other network elements are accessible to the network element via the optical fabric at which of the time slots, to queue packets that are destined to the destination nodes that are coupled to the other network elements, and to transmit the queued packets to the destination nodes that are coupled to other network elements, via the optical switch fabric, in accordance with the schedule plan.

There is additionally provided, in accordance with an embodiment that is described herein, a method for communication, including, in each of multiple network elements that are coupled to multiple network nodes, and to an optical fabric including one or more optical switches that provide optical paths between respective pairs of network elements, at predefined time slots, holding a schedule plan that specifies which of the destination nodes that are coupled to other network elements are accessible to the network element via the optical fabric at which of the time slots. Packets that are destined to the destination nodes that are coupled to the other network elements are queued, and the queued packets are transmitted to the destination nodes that are coupled to other network elements, via the optical switch fabric, in accordance with the schedule plan.

These and other embodiments will be more fully understood from the following detailed description of the embodiments thereof, taken together with the drawings in which:

DETAILED DESCRIPTION OF EMBODIMENTS

Overview

Figure 1:
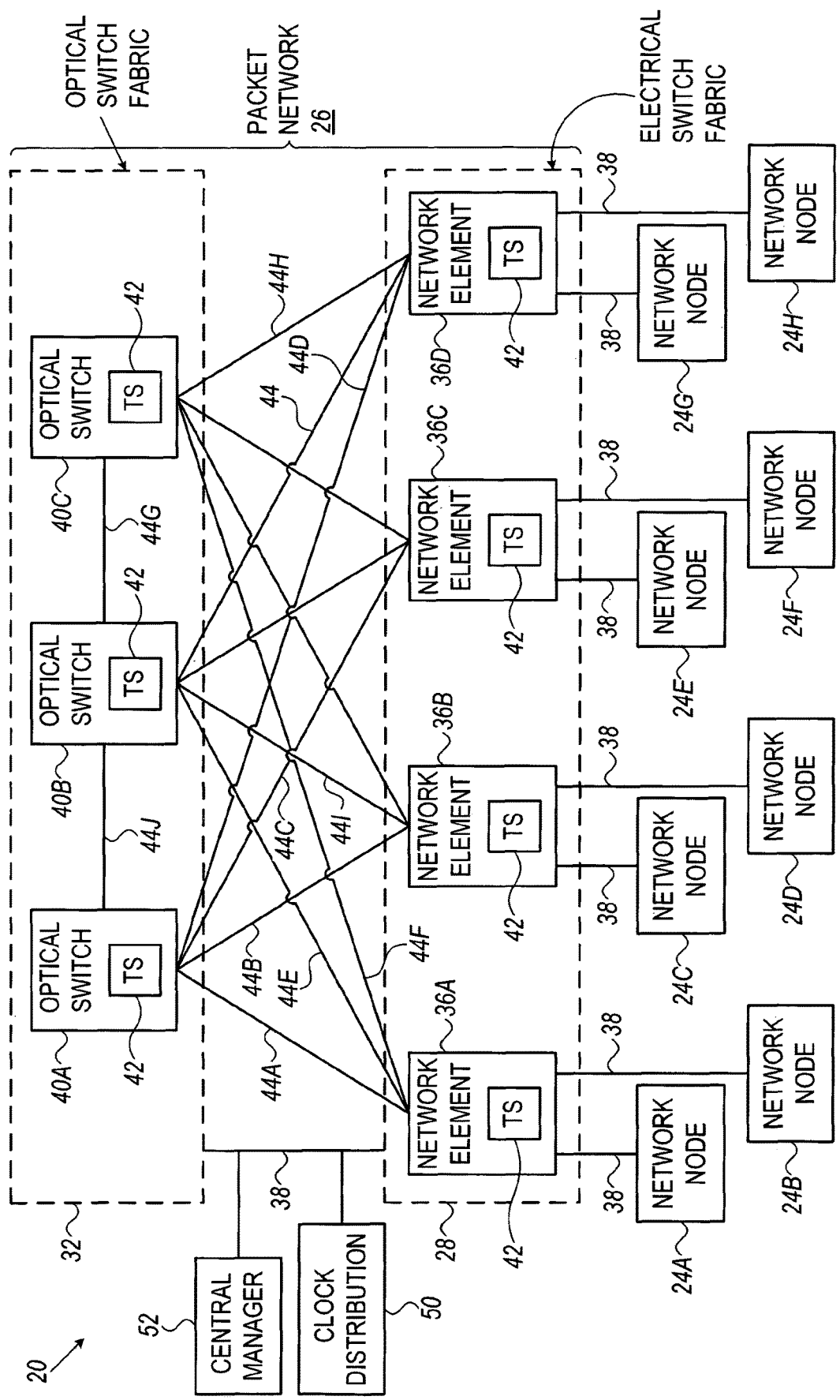
FIG. 1 is a block diagram that schematically illustrates a computing system comprising electrical and optical communication domains, in accordance with an embodiment that is described herein.

Embodiments that are described herein provide systems and methods for supporting synchronized time division communication among network nodes, over a network comprising both electrical network elements and optical switches.

In principle, the network nodes could communicate over a network comprising only electrical network elements such as switches or routers that forward packets by inspecting the destination addresses within the packets headers. In large-scale computing systems such as data centers, however, paths along such a network between end nodes would typically comprise a large number of network elements, which increases complexity, latency and cost.

Some of the embodiments that will be described below refer to a computing system in which multiple network nodes are coupled to multiple network elements, which are in turn coupled to an optical switch fabric comprising one or more optical switches.

An optical switch in the optical switch fabric receives via an optical port, a beam of light carrying data, and directs the beam to another optical port of the optical switch. The optical switch is typically unable to inspect the data modulated in the light beam for making switching decisions, and therefore applies optical switching using a time division approach, as will be described below.

In some embodiments, each optical switch in the optical switch fabric connects using optical fiber links to multiple network elements, and possibly to other optical switches. In some embodiments, the optical switch optically connects between pairs of its optical ports at any given time. For example, an optical switch may be configured to connect one of its optical ports to each of the other optical ports at different time instances, under suitable control. In an embodiment, an optical switch may operate in a one-to-many mode, in which the optical switch connects a single input optical port to multiple output optical ports, simultaneously. This is useful, for example, for transmitting multicast packets via an optical switch.

At any given time, one or more optical ports of an optical switch may remain optically unconnected. A network element coupled to an optical port should refrain from transmitting and receiving data (over light) via that optical port at time slots during which the optical port is optically unconnected.

In some embodiments, the optical switches operate in accordance with a predefined optical schedule, causing the optical switch fabric to provide optical paths between respective pairs of network elements, at predefined time slots.

Each network element receives packets from one or more network nodes, and queues the received packets for transmission via the optical switch fabric to network nodes that are coupled to other network elements. For transmitting a packet to a given destination node, the network element should schedule the transmission of the packet to a time slot during which the optical switch fabric provides an optical path from the network element to a network element to which the given destination work connects.

More generally, to synchronize the operation of the network elements to that of the optical switches, each network element holds a schedule plan that specifies, for each port of the network element that is coupled to an optical switch, which of the destination nodes that are coupled to other network elements are accessible via the optical fabric at which of the time slots. A network element transmits the queued packets to their destination nodes via the optical switch fabric in accordance with the schedule plan.

In an embodiment, the schedule plan may be provisioned to the network elements by a central manager that may also provision the optical schedule to the optical switches. Provisioning the schedule plan is typically carried out at initialization, before the network elements receive packets for transmission via the optical switch fabric.

To apply time division scheduling across the computing system, the optical switches and the network elements are synchronized to a common time reference. In some embodiments, each optical switch and each network element comprises a timestamp that is indicative of the current time. The timestamp may be represented using any suitable format such as, for example, the UTC standard cited above.

In some embodiments, a clock distribution module sends time synchronization messages to the optical switches and to the network elements, for updating their local timestamps. The time synchronization messages may be distributed using any suitable protocol such as the PTP standard cited above.

In some embodiments, the network element queues packets having respective priority levels, and that are destined to transmission via the optical switch fabric, in multiple respective priority queues. In scheduling transmission, the network element first selects a priority queue using some predefined arbitration scheme, determines a time slot for a packet in the selected priority queue using the schedule plan, and transmits the packet from the selected priority queue at the determined time slot.

In the disclosed techniques, a time division approach is employed for coordinating transmission of packets queued in network elements to destination nodes via the optical switches. The network elements transmit packets at selected time slots during which the optical switches provide optical paths toward the correct destinations. Using the disclosed embodiments enables to construct a large-scale and low complexity computing system that supports communication among end nodes at low delay and high bandwidth.

System Description

FIG. 1 is a block diagram that schematically illustrates a computing system 20 comprising electrical and optical communication domains, in accordance with an embodiment that is described herein. In computing system 20, network nodes 24 communicate with one another over a packet network 26 that comprises an electrical switch fabric 28 and an optical switch fabric 32.

Electrical switch fabric 28 comprises network elements 36 such as switches or routers operating using any suitable communication protocol. For example, the network elements may operate in accordance with Ethernet, Internet Protocol (IP), InfiniBand™ or any other protocol. In FIG. 1, the electrical switch fabric comprises four network elements denoted 36A . . . 36D. Alternatively, other suitable numbers of network elements can also be used.

A small or medium sized data center system may comprise on the order of 1000 switches such as network elements 36. A large data center system may comprise over 100,000 switches for interconnecting a number on the order of a million network nodes. A switch such as network element 36 may comprise, for example, between 32 and 256 ports, or any other suitable number of ports.

Each network element 36 is coupled to one or more network nodes 24 (two in the present example) using links 38. Alternatively, other configurations with other suitable numbers of end nodes per network element can also be used. In some embodiments, a network element 36 may be coupled to a network node 24 indirectly via one or more additional network elements and links 38. Links 38 typically comprise electrical links of any suitable type. In some embodiments, for supporting high bandwidth requirements, links 38 for coupling a network element to an end node may comprise an optical fiber link, not to be confused with fiber links for connecting to the optical switch fabric (see below).

Optical switch fabric 32 comprises one or more optical switches 40. In FIG. 1, the optical switch fabric comprises three optical switched denoted 40A . . . 40C. Alternatively, other suitable numbers of optical switches can also be used. The actual number of optical ports may vary among different computing systems. For example, a small system may comprise on the order of 16 optical switches, whereas a large system may comprise on the order of 16,000 or more optical switches.

Each optical switch 40 optically connects to one or more network elements 36 (and possibly to other optical switches 40) using optical fiber links 44. An optical fiber link serves for transmitting a beam light having a suitable wavelength between the ends of the fiber. A signal transmitted via an optical fiber link 44 can be modulated at rates of several tens of Gigabits/second and beyond. In alternative embodiments, any other suitable type of optical connections, other than fiber links 44, can also be used.

In the example of FIG. 1, electrical switch fabric 28 comprises a single layer of network elements 36 between network nodes 24 and optical switch fabric 32. In addition, optical switch fabric 32 comprises a single layer of optical switches 40. In alternative embodiments, other suitable layering configurations of the optical switches, network elements or both, can also be used.

Network elements 36 communicate user data with one another via the optical switch fabric. In the example of FIG. 1, each network element 36 connects using optical fiber links 44 to each of the optical switches, and each of the optical switches connects using optical fiber links 44 to each of the network elements. This topology is not mandatory, and in alternative embodiments, partial interconnections between network elements 36 and optical switches 40 can also be used.

As will be described below, an optical switch connects to fiber links using optical ports. Typically, the optical switch cannot inspect the data carried in a light beam for making forwarding decisions, and provides optical paths between the optical ports in accordance with a time division optical schedule. In general, the optical switch fabric may provide an "optical path" through one or more optical switches and fiber links.

In the time division approach, time is divided into time slots. The optical schedule specifies which pairs of optical ports are optically connected during each time slot. For example, optical switch 40A may optically connect fiber link 44A to each of fiber links 44B, 44C and 44D at three different time slots.

In order to communicate via the optical switch fabric, each network element 36 coordinates packet transmission to time slots during which the optical switch fabric provides optical paths to the respective destination nodes. For achieving accurate time synchronization across network 26, each optical switch 40 and each network element 36 holds a local timestamp 42 that provides a time reference indication, based on a suitable time standard. In the present example, timestamps 42 are formatted in accordance with the UTC standard, cited above.

Computing system 20 comprises a clock distribution module 50 coupled to optical switch fabric 32 and to electrical switch fabric 28. Clock distribution module 50 distributes timing messages across network 26 for updating timestamps 42. The timing messages can be delivered using any suitable communication protocol such as, for example, UDP over IP or Ethernet over IP.

Clock distribution module 50 distributes the timing messages using a clock synchronization protocol, such as the PTP cited above. Using PTP, the achievable synchronization accuracy across computing system 20 can be between several nanoseconds to several tens of nanoseconds, e.g., an accuracy of 5 nanoseconds. In some embodiments, successive time slots in the schedule plan are separated in the schedule plan with a gap time so as to ensure correct packet delivery via the optical switches even though the achievable time accuracy across the system is limited. A larger gap time should be used for reduced achievable accuracy, and vice versa.

Computing system 20 comprises a central manager 52 coupled to optical switch fabric 32 and to electrical switch fabric 28. Central manager 52 performs various management and other tasks, such as configuring optical switches 40 with an optical switching schedule. In some embodiments, based on the optical schedule, central manager 52 determines a schedule plan for packet transmission by the network elements via the optical switch fabric, and configures the schedule plan to network elements 36.

The central manager typically configures the optical schedule to the optical switches and the schedule plan to the network elements once, at initialization. Alternatively, the central manager may reconfigure the optical switches, the network element or both, at any suitable time, e.g., based on time-varying traffic patterns.

Note that determining the schedule plan is carried out beforehand, and as such, the schedule plan is independent from packets that are actually received from the network nodes at a later time and queued for transmission via the optical switch fabric.

Network nodes 24 may communicate with one another over packet network 26 in various ways. In the example of FIG. 1, each of network nodes 24A and 24B can communicate with each of network nodes 24C and 24D via network element 36A, optical switch 40A that provides an optical path between optical fiber links 44A and 44B, and network element 36B. As another example, network node 24A can communicate with network node 24G via network elements 36A and 36D, optical switch 40C and optical fiber links 44F and 44H.

In some embodiments, a network element transmits packets to the optical switch fabric and receives packets from the optical switch fabric using different ports and fiber links. For example, network element 36A transmits packets to optical switch 40A via optical fiber link 44A, and receives packets from optical switches 40B and 40C via respective fiber links 44E and 44F. In other embodiments, a port coupled to a an optical switch can transmit and receive packets to and from the optical switch fabric, by allocating in the schedule plan different time slots for packet transmission and reception. Further alternatively, a given port coupled to an optical switch transmits data and receives data over light during the same time slot, e.g., using different respective wavelengths of the beams of lights in transmission and reception.

In some embodiments, an optical path within optical switch fabric 32 comprises multiple optical switches 40. For example, network element 36A may communicate with network element 36D via optical switches 40A, 40B and 40C, including fiber links 44J and 44G.

In some embodiments, at a given time slot, the optical switch fabric may provide multiple different optical paths. For example, at a selected time slot, optical switch 40A connects between fiber links 44A-44B, and simultaneously, optical switch 40B connects between fiber links 44E-44I.

Structure of the Optical Switches and Network Elements

Figures 2, 3:
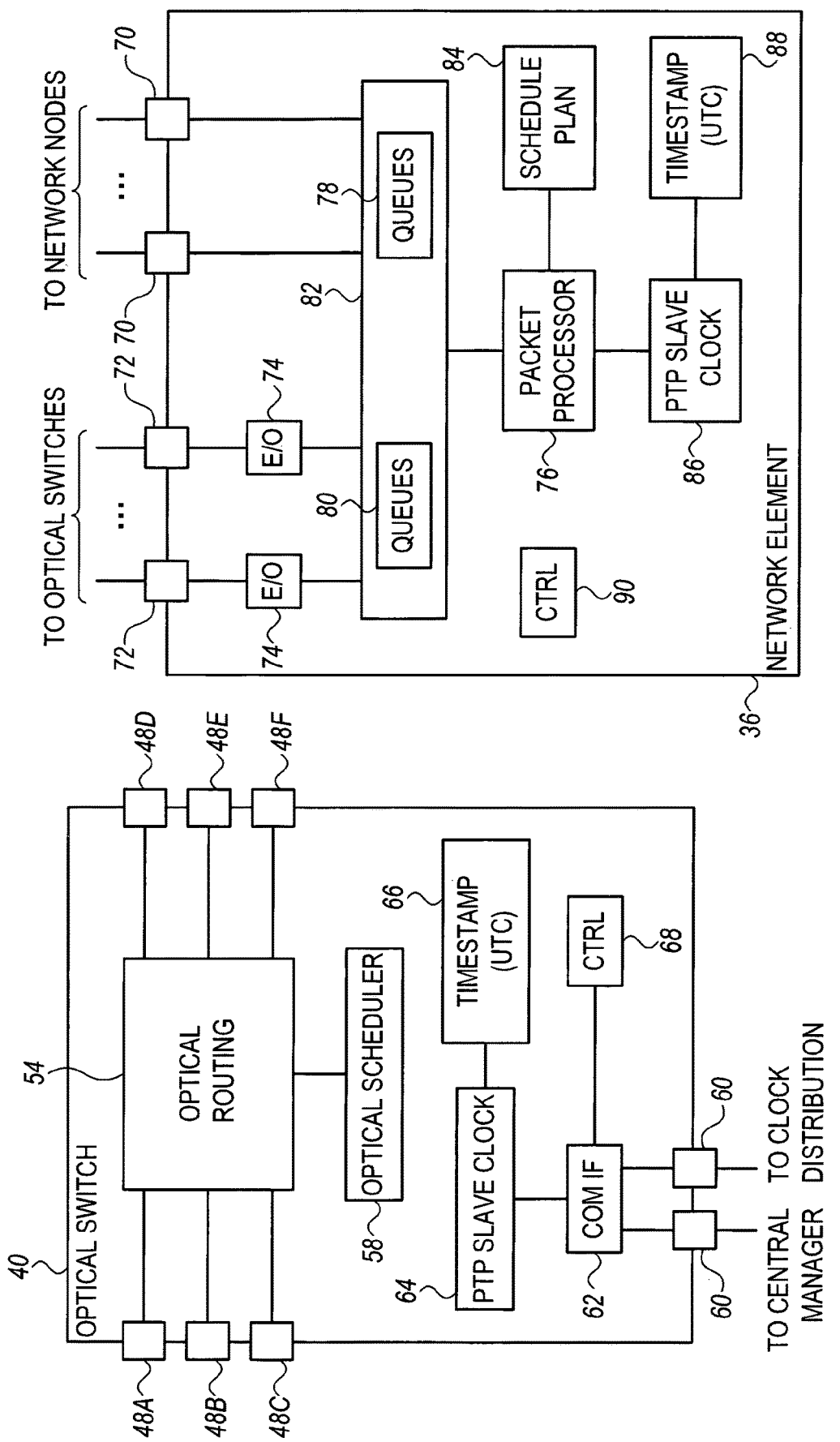
FIG. 2 is a block diagram that schematically illustrates an optical switch of the optical switch fabric of FIG. 1, in accordance with an embodiment that is described herein.
FIG. 3 is a block diagram that schematically illustrates a network element of the electrical switch fabric of FIG. 1, in accordance with an embodiment that is described herein.

FIG. 2 is a block diagram that schematically illustrates an optical switch 40 of optical switch fabric 32 of FIG. 1, in accordance with an embodiment that is described herein.

Optical switch 40 comprises multiple optical ports 48 for connecting via optical fiber links 44 to network elements 36 and possibly to other optical switches. Optical ports 48 may comprise any suitable type of fiber-optic connectors for connecting to optical fiber links 44. In the present example, optical switch 40 comprises six optical ports denoted 48A . . . 48F. Alternatively, any other suitable number of optical ports larger than two can also be used.

Optical switch 40 comprises an optical routing module 54 that is coupled to the optical ports, and that is controlled by an optical scheduler 58. At any given time, optical scheduler 58 controls optical routing module 54 to provide optical paths between one or more pairs of optical ports 48. The optical switching schedule applied by the optical scheduler is configured manually or by an external entity such as central manager 52 of FIG. 1. Alternatively, the optical switching schedule is predefined at production.

The optical switching schedule may specify a time slot during which the optical routing module simultaneously connects, for example, between pairs of the optical ports, e.g., (48A-48D), (48B-48E) and (48C-48F). At a subsequent time slot, the optical scheduler may control the optical routing module to provide simultaneous optical paths (48A-48E), (48B-48F) and (48C-48D).

In some embodiments, the optical switching schedule specifies optical paths between one of the optical ports and each of the other optical ports. For example, using an optical switching schedule of this sort, at different time slots the optical routing module connects between optical port 48A, and each of optical ports 48B . . . 48F (or a subset of optical ports 48B . . . 48F). The optical switching schedule may cyclically repeat the sequence of optical paths provided. In some embodiments, optical routing module 54 supports a one-to-many mode of optical connectivity, e.g., between port 48A and each of ports 48D, 48E and 48F, simultaneously. Such a one-to-many configuration can be used, for example, for optical switching of multicast packets.

Optical switch 40 comprises one or more ports 60 that are coupled via links 38 to central manager 52 and to clock distribution module 50. The communication via ports 60 is carried out using a communication interface 62. The optical switch further comprises a controller 68 that handles various management tasks of the optical switch such as configuring the optical schedule to optical scheduler 58, e.g., in response to receiving, via communication interface 62, a configuration message from the central manager.

Optical switch 40 comprises a PTP slave clock 64 and a timestamp 66. In response to receiving a time synchronization message from a PTP master clock (e.g., implemented within clock distribution module 50,) the PTP slave clock updates timestamp 66 based on the time synchronization message. In some embodiments, timestamp 66 comprises a UTC timestamp, similar to timestamp 42 of FIG. 1.

FIG. 3 is a block diagram that schematically illustrates a network element 36 of electrical switch fabric 28 of FIG. 1, in accordance with an embodiment that is described herein.

Network element 36 comprises multiple ports 70 for coupling to network nodes 24 using links 38. Each port 70 comprises a suitable mechanical connector (not shown) for coupling to a link 38 and an electrical circuit (not shown) for transmitting and receiving packets to and from the network nodes. In a typical implementation, port 70 functions both as an input port for receiving packets, and as an output port for transmitting packets.

Network element 36 further comprises one or more optical ports 72 for connecting to optical switches 40 using optical fiber links 44. Optical ports 72 may comprise any suitable type of fiber-optic connectors for connecting to optical fiber links 44. Each optical port 72 connects to a respective Electrical/Optical converter 74 of the network element. In the direction toward the optical switch fabric, E/O converter 74 converts electrical signals carrying data bits for transmission into optical signals by modulating a beam of light with the data bits. In the opposite direction, E/O converter 74 converts optical signals received via the optical fiber link into data bits, by demodulating the received beam of light to extract the data bits carried in the optical signals.

Network element 36 comprises a packet processor 76 that processes incoming and outgoing packets. The packet processor applies to packets received via ports 70 and via optical ports 72, various processing such as verifying the correctness of the data in the packet payload, packet classification and prioritization, and routing. The packet processor typically checks certain fields in the packets headers for the purpose of packet classification and routing. The header fields contain addressing information, such as source and destination addresses and TCP or UDP port numbers, and the underlying network protocol used.

The packet processor stores processed packets received via optical ports 72, and that are awaiting transmission to network nodes 24 via ports 70, in one or more queues 78. The packet processor stores processed packets received via ports 70 and are awaiting transmission to the optical switch fabric via optical ports 72, in one or more queues 80. In some embodiments, queues 78 and 80 are implemented in a buffer 82 such as a shared buffer that dynamically manages queueing resources within the network element. The buffer storing the queues may comprise, for example, a Random Access Memory (RAM), or any other suitable type of memory using any suitable storage technology.

The packet processor schedules transmission of packets from queues 78 towards network nodes 24 using any suitable arbitration scheme, such as, for example, a round-robin scheduling scheme, or based on a Quality of Service (QoS) attribute in the packet headers.

In some embodiments, the packet processor schedules transmission of packets stored in queues 80 towards the optical switch fabric based on a schedule plan 84. Per each port 72 and queue 80 of this port, the schedule plan specifies one or more destination nodes and respective time slots during which the optical switch fabric provides respective optical paths to these destination nodes. In some embodiments, a port 72 is associated with multiple queues 80 having different priority levels. In such embodiments, the packet processor performs queue arbitration before scheduling a time slot.

Network element 36 comprises a PTP slave clock 86 and a timestamp 88 that may be identical or similar to PTP slave clock 64 and timestamp 66 of the optical switch. PTP slave clock 86 receives from clock distribution module 50 timing and synchronization messages for updating timestamp 88.

Network element 36 comprises a controller 90, which performs various management and packet-processing functions of the network element. For example, controller 90 configures packet processor 76 to apply the desired routing plan. In some embodiments, controller 90 receives from central manager 52 a schedule information for the network element, and configures schedule plan 84 based on the schedule information.

The configurations of computing system 20, network element 36 and optical switch 40 are given by way of example, and other suitable computing system, network element and optical switch configurations can also be used.

Some elements of network element 36, such as packet processor 76, PTP slave clock 86 and controller 90 may be implemented in hardware, e.g., in one or more Application-Specific Integrated Circuits (ASICs) or Field-Programmable Gate Arrays (FPGAs). Additionally or alternatively, some elements of the network element can be implemented using software, or using a combination of hardware and software elements. Schedule plan 84 may be stored in any suitable memory (not shown) such as, for example, a Random Access Memory (RAM) or a nonvolatile memory. Buffer 82 may be implemented in any suitable memory such as a RAM, for example. Timestamp 88 may be stored, for example, in a suitable register or in a memory such as a RAM or nonvolatile memory.

In some embodiments, some of the functions of at least one of packet processor 76, PTP slave clock 86 and controller 90 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the term "circuitry" refers to all the elements of network element 36 excluding ports 70 and optical ports 72. In FIG. 3, the circuitry comprises packet processor 76, PTP slave clock 86, queues 78 and 80 in buffer 82, controller 90, schedule plan 84, timestamp 88, and E/O converters 74.

Methods for Time-division Communication Via Optical Switch Fabric

Figure 4:
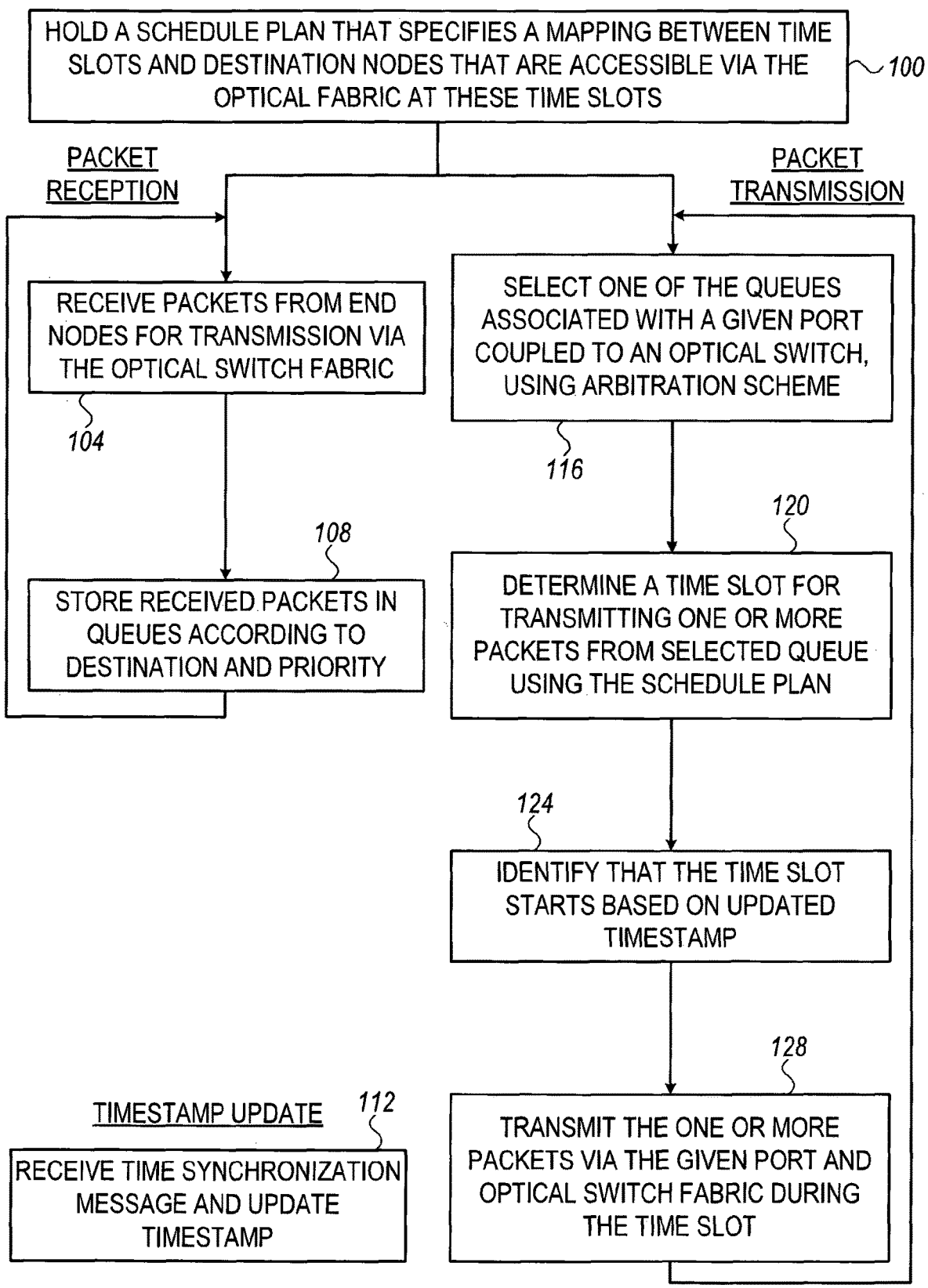
FIG. 4 is a flow chart that schematically illustrates a method for time division communication via an optical switch fabric, in accordance with an embodiment that is described herein.

FIG. 4 is a flow chart that schematically illustrates a method for time division communication via optical switch fabric 32, in accordance with an embodiment that is described herein.

The method will be described as being executed by network element 36 of FIGS. 1 and 3.

The method begins with controller 90 of the network element holding a schedule plan 84, at a schedule configuration step 100. The schedule plan specifies a mapping between time slots and destination nodes that are accessible by each port 72 via the optical switch fabric during these time slots.

In some embodiments, the duration of the time slots is sufficient for transmitting a single packet. The time slot duration may include margins for allowing the optical switches to stabilize. In other embodiments, the duration of the time slots is selected sufficiently long for transmitting multiple packets to one or more respective destinations.

In some embodiments, the sequence of destination nodes that are accessible by a given source node in successive time slots specified by the schedule plan comprises a cyclic sequence of the destination nodes. For example, for three destination nodes denoted D1, D2 and D3, the schedule plan may specify a sequence (D1, D2, D3) accessible at respective times (t, t+T, t+2T), wherein t is a staring time and T denotes the time duration of the time slots. D1, for example is therefore accessible at starting times of the form (t+n·3T). Note that since there are typically multiple possible paths between two end nodes, the schedule plan can be designed to achieve shortest latency delivery. In the example above, with a properly designed schedule plan, D1 would be accessible with a maximal latency shorter than 3T.

In some embodiments, each time slot is specified by its starting time (and possible ending time or duration,) for example, in accordance with the UTC format. The schedule plan is aligned to the optical schedule assigned to the optical switches in the optical switch fabric. The network element may receive the schedule plan from central manager 52, e.g., at initialization or power up. Alternatively, the schedule plan is preconfigured to the network element.

The method has mainly three parts: (i) a packet reception part, (ii) a packet transmission part, and (iii) a timestamp update part. The packet reception and transmission parts are typically carried out in parallel. The timestamp update part is typically performed asynchronously to the other two parts.

The reception part starts with packet processor 76 receiving packets from network nodes 24 to which the network element connects, via ports 70, at a reception step 104. The received packets are destined for transmission via the optical switch fabric to one or more destination nodes 24. At a queueing step 108, packet processor 76 processes the packets received via ports 70, and stores at least some of these packets in one or more queues 80, for transmission to the optical switch fabric via ports 72.

In the present example, it is assumed that each port 72 is associated with multiple queues 80 having different respective priority levels, also referred to as Quality of Service (QoS) levels. The packet processor determines, by inspecting the packets headers, the destination address and the priority level of each packet. The packet processor selects for a packet (i) a port 72 based on the destination address field of the packet, and (ii) one of queues 80 of the selected port, in accordance with the priority level of the packet, and stores the packet in the selected queue 80. Following step 108 the method loops back to step 104 to receive subsequent packets.

In the timestamp updating part, at a timestamp synchronization step 112, PTP slave clock 86 of the network element receives a time synchronization message from clock distribution module 50. In some embodiments, the time synchronization message is generated using a PTP master clock (not shown). The time synchronization message typically comprises one or more packets that the network element receives via a port 70. In response to the time synchronization message, PTP slave clock 86 updates local timestamp 88. Step 112 is typically triggered repeatedly, at some suitable time intervals. In some embodiments, PTP slave clock 86 receives time synchronization messages at a rate of about 500 million messages per second, and continues ticking between successive updates. In an embodiment, the time synchronization messages specify time information at a resolution of 2 nanoseconds, which provides a cross-system time synchronization accuracy of about 5 nanoseconds. Alternatively, other suitable updating rates and time resolution values can also be used.

The packet transmission part is typically applied simultaneously for multiple ports 72. The description, however, is essentially described for one port 72 for the sake of clarity.

At an arbitration step 116, packet processor 76 selects a queue 80 per each port 72. In the present example, it is assumed that the underlying arbitration scheme is priority-based. For example, the arbitrary scheme may allocate a predefined portion of the bandwidth available for port 72 to one of queues 80 of the port, and divide the remaining bandwidth evenly among the other queues of the port. In another arbitration scheme, one or more predefined queues 80 may be selected with higher priority than any other queue 80 of the port. Further alternatively, any other suitable arbitration scheme for queue selection can also be used.

At a time slot determination scheme 120, the packet processor determines, using schedule plan 84, a time slot for transmitting a packet from queue 80 that was selected at step 116. For example, the packet processor inspects the destination address field of the packet at the head of selected queue 80, and maps the destination address to a respective time slot using schedule plan 84. Alternatively, the packet processor determines multiple time slots for multiple packets in selected queue 80.

At a scheduling step 124, the packet processor identifies that the time slot of step 120 actually starts, e.g., by comparing the starting time of the time slot to the current value of timestamp 88. At a transmission step 128, in respond to identifying that the time slot assigned to a packet has started, the packet processor transmits the packet from queue 80 via the relevant port 72. Following step 128 the method loops back to step 116 to select another queue 80 for port 72 using the arbitration scheme.

In some embodiments, at step 120, the packet processor selects in queue 80 multiple packets that are destined to the same destination node. In such embodiments, the multiple packets may be transmitted during the same time slot.

The embodiments described above are given by way of example, and other suitable embodiments can also be used. For example, although the embodiments described above mainly refer to transmission via a fiber link using a beam light having a given wavelength, the disclosed techniques are also applicable to cases in which multiple beams of different wavelengths are used simultaneously for transmission over the fiber links.

Although the embodiments described herein mainly address efficient communication among network nodes, the methods and systems described herein can also be used in other applications, such as in a multi-processor system in which a large number of processors communicate with one another.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   at least one port coupled to an optical fabric comprising one or more optical switches that provide optical paths between the at least one port and multiple destination nodes, at predefined time slots; and
   circuitry, configured to:
     hold a predetermined schedule plan that specifies which of the destination nodes are accessible via the optical fabric at which of the time slots, the predetermined schedule plan having been determined before receiving packets for transmission via the optical fabric;
     queue packets that are destined to the destination nodes; and
   transmit the queued packets via the at least one port in accordance with the predetermined schedule plan.

2. The network element according to claim 1, wherein the circuitry is configured to hold the predetermined schedule plan by holding a mapping between the time slots, and respective destination nodes that are accessible by the at least one port via the optical switch fabric during the time slots.

3. The network element according to claim 1, wherein the predetermined schedule plan is independent from packets that are actually queued for transmission via the at least one port.

4. The network element according to claim 1, wherein the schedule plan specifies a time slot for transmitting packets to a given destination node, before queueing packets that are destined to the given destination node.

5. The network element according to claim 1, wherein the predetermined schedule plan specifies a cyclic sequence of destination nodes that are accessible in a sequence of successive time slots.

6. The network element according to claim 1, wherein the circuitry is configured to hold a time reference that is shared with the optical switches, and to transmit a queued packet at a respective time slot in response to identifying that the time slot has started, based on the time reference.

7. The network element according to claim 6, wherein the circuitry is configured to receive time synchronization massages, and to update the time reference in response to the time synchronization massages.

8. The network element according to claim 1, wherein the circuitry is configured to queue packets having respective priority levels, and that are destined to the at least one port, in multiple respective priority queues, to select a priority queue using a predefined arbitration scheme, to determine a time slot for a packet in the selected priority queue using the predetermined schedule plan, and to transmit the packet from the selected priority queue at the determined time slot.

9. The network element according to claim 1, wherein circuitry is configured to transmit the queued packets to the optical fabric via a first port of the network element, and to receive packets from the switch fabric via a different second port of the network element.

10. The network element according to claim 1, wherein the circuitry is configured to transmit a first packet to the optical fabric via a given port at a given time slot, and to receive a second packet from the optical fabric via the given port at the given time slot, wherein data comprised in the first and second packets is modulated over light beams having first and second different respective wavelengths.

11. A method for communication, comprising:
in a network element that comprises at least one port coupled to an optical fabric comprising one or more optical switches that provide optical paths between the at least one port and multiple destination nodes, at predefined time slots, holding a predetermined schedule plan that specifies which of the destination nodes are accessible via the optical fabric at which of the time slots, the predetermined schedule plan having been determined before receiving packets for transmission via the optical fabric;
queueing packets that are destined to the destination nodes; and
transmitting the queued packets via the at least one port in accordance with the predetermined schedule plan.

12. The method according to claim 11, wherein the predetermined schedule plan specifies a mapping between the time slots, and respective destination nodes that are accessible by the at least one port via the optical switch fabric during the time slots.

13. The method according to claim 11, wherein the predetermined schedule plan is independent from packets that are actually queued for transmission via the at least one port.

14. The method according to claim 11, wherein the predetermined schedule plan specifies a time slot for transmitting packets to a given destination node, before queueing packets that are destined to the given destination node.

15. The method according to claim 11, wherein the predetermined schedule plan specifies a cyclic sequence of destination nodes that are accessible in a sequence of successive time slots.

16. The method according to claim 11, and comprising holding a time reference that is shared with the optical switches, and wherein transmitting the queued packets comprises transmitting a queued packet at a respective time slot in response to identifying that the time slot has started, based on the time reference.

17. The method according to claim 16, and comprising receiving time synchronization massages, and updating the time reference in response to the time synchronization massages.

18. The method according to claim 11, wherein queuing the packets comprises queuing packets having respective priority levels, and that are destined to the at least one port, in multiple respective priority queues, and wherein transmitting the queued packets comprises selecting a priority queue using a predefined arbitration scheme, determining a time slot for a packet in the selected priority queue using the predetermined schedule plan, and transmitting the packet from the selected priority queue at the determined time slot.

19. The method according to claim 11, wherein transmitting the queued packets comprises transmitting the queued packets to the optical fabric via a first port of the network element, and comprising receiving packets from the switch fabric via a different second port of the network element.

20. The method according to claim 11, and comprising transmitting a first packet to the optical fabric via a given port at a given time slot, and receiving a packet from the optical fabric via the given port at the given time slot, wherein data comprised in the first and second packets is modulated over light beams having first and second different respective wavelengths.

21. An apparatus for communication, comprising:
multiple network elements coupled to multiple network nodes, and to an optical fabric comprising one or more optical switches that provide optical paths between respective pairs of network elements, at predefined time slots, wherein each of the network elements is configured to:
hold a predetermined schedule plan that specifies which of the destination nodes that are coupled to other network elements are accessible to the network element via the optical fabric at which of the time slots, the predetermined schedule plan having been determined before receiving packets for transmission via the optical fabric;
queue packets that are destined to the destination nodes that are coupled to the other network elements; and
transmit the queued packets to the destination nodes that are coupled to other network elements, via the optical switch fabric, in accordance with the predetermined schedule plan.

22. A method for communication, comprising:
in each of multiple network elements that are coupled to multiple network nodes, and to an optical fabric comprising one or more optical switches that provide optical paths between respective pairs of network elements, at predefined time slots:
holding a predetermined schedule plan that specifies which of the destination nodes that are coupled to other network elements are accessible to the network element via the optical fabric at which of the time slots, the predetermined schedule plan having been determined before receiving packets for transmission via the optical fabric;
queueing packets that are destined to the destination nodes that are coupled to the other network elements; and
transmitting the queued packets to the destination nodes that are coupled to other network elements, via the optical switch fabric, in accordance with the predetermined schedule plan.

* * * * *